2,559,055

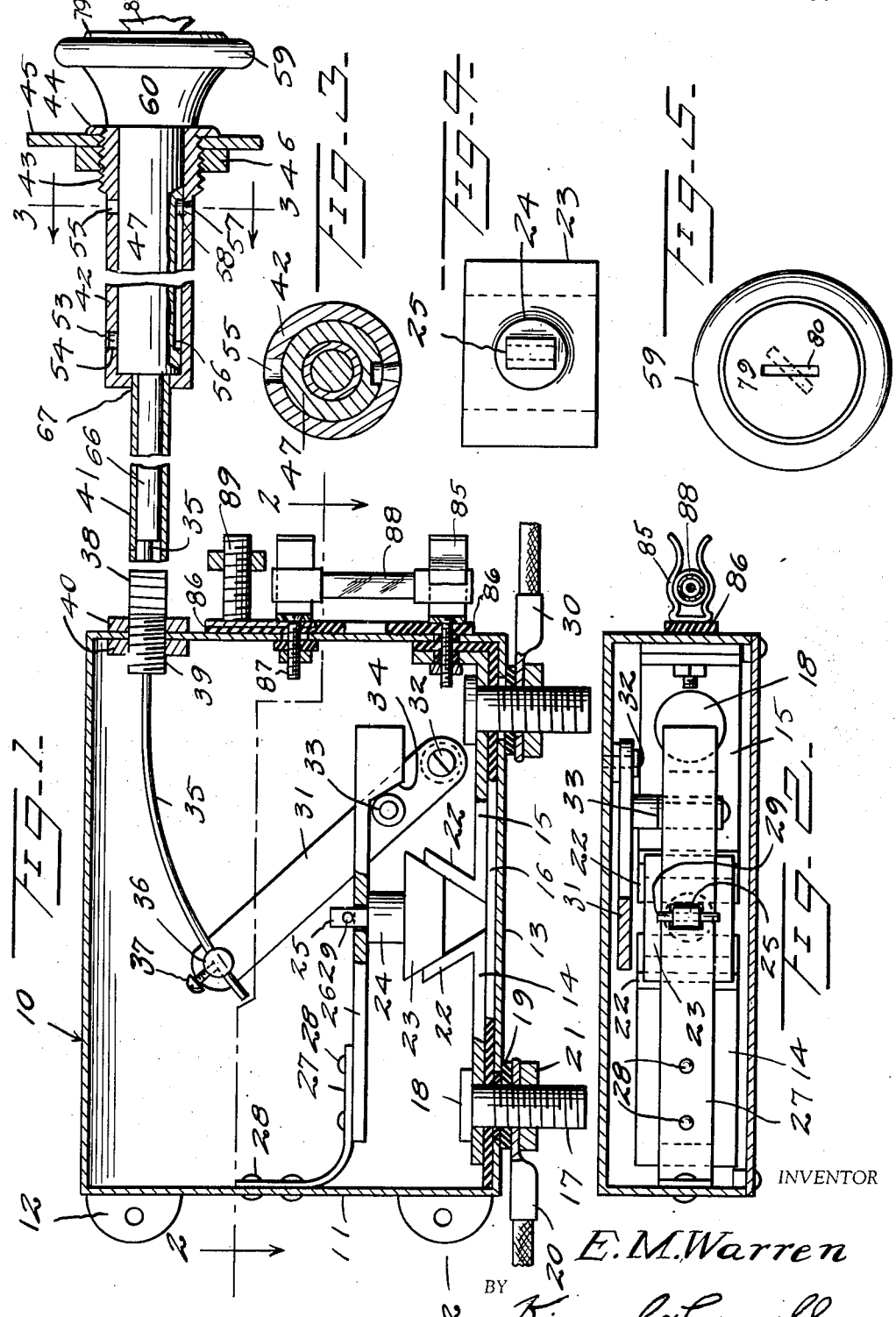
July 3, 1951 — E. M. WARREN — 2,559,055
SWITCH APPARATUS
Filed Nov. 15, 1949 — 2 Sheets-Sheet 1
INVENTOR
E. M. Warren
BY Kimmel & Crowell
ATTORNEYS July 3, 1951  E. M. WARREN  2,559,055
SWITCH APPARATUS
Filed Nov. 15, 1949  2 Sheets-Sheet 2
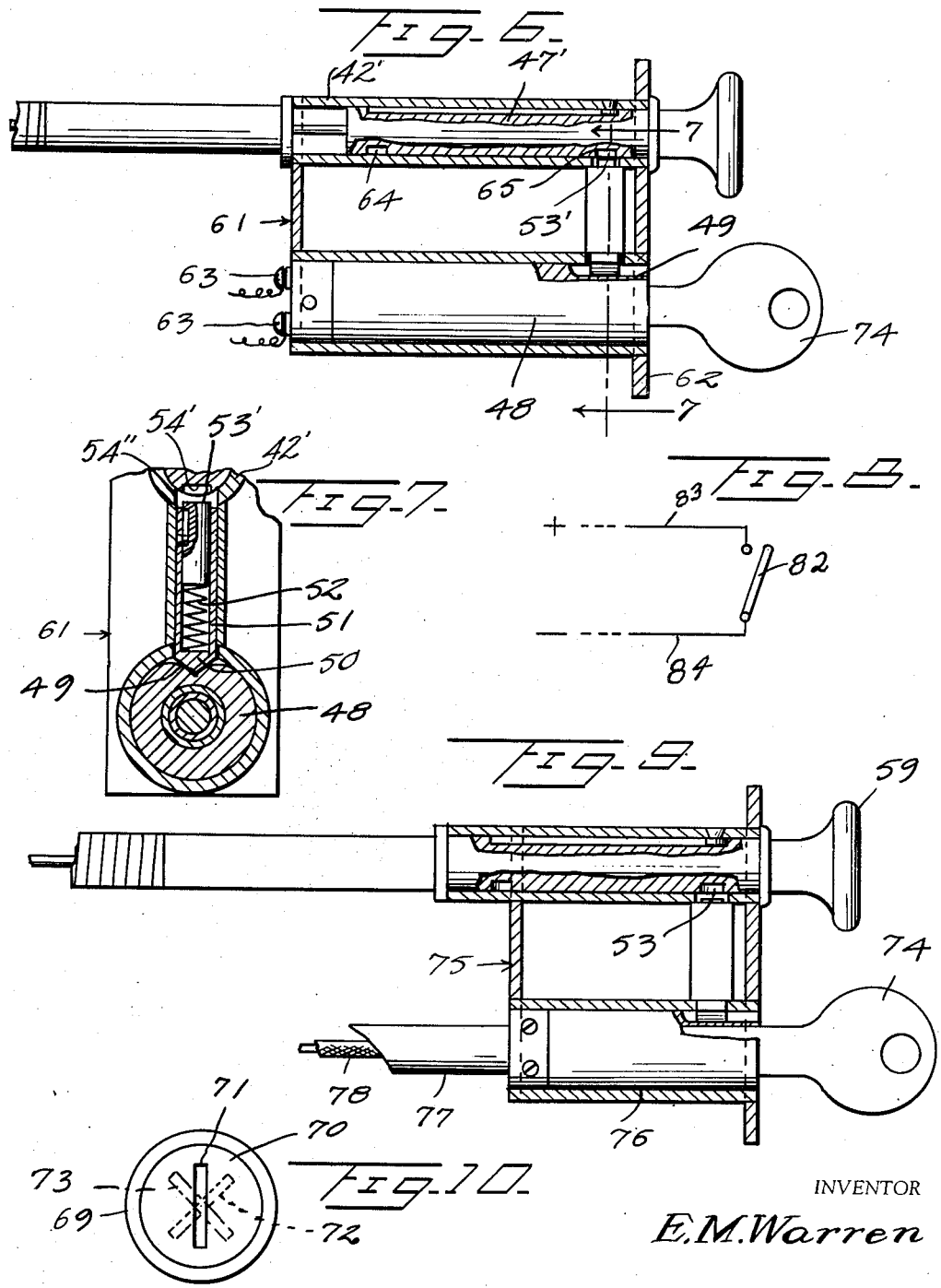
INVENTOR
E. M. Warren
BY Kimmel & Crowell
ATTORNEYS Patented July 3, 1951

UNITED STATES PATENT OFFICE 2,559,055

SWITCH APPARATUS

Estel M. Warren, Clinton, N. C.

Application November 15, 1949, Serial No. 127,307

2 Claims. (Cl. 200—161)

This invention relates to electrical switches for automobiles and more particularly a driver operated biased disconnect switch disconnecting the battery.

A primary object and purpose of this invention is to provide an easily operated battery disconnecting switch for a motor vehicle. It is a well known fact that a great many automobile fires are caused by short circuits that receive the full output of current of which the battery is capable of delivering and that the operator of the car is helpless to avert the fire due to his inability to disconnect the heavy leads connecting the battery to the electrical system of the automobile.

A further object is to provide an electrical control system for motor vehicles which can be readily locked in either an open or closed position. It is relatively common for automobile horns to become stuck or grounded so as to continuously blow even though the vehicle is unattended resulting in an extremely undesirable annoyance as to the sound as well as possibly a complete discharge of the battery. Both of the aforesaid conditions could be stopped or guarded against if the operator had been able to completely disconnect his battery from the electrical system of the car at the same time that he removed his ignition switch. Furthermore it is often desirable to guard against unauthorized blowing of the horn or even operation of the starter by children.

A still further object is to provide a motor vehicle control wherein the entire electrical system can be locked in an open position and inoperable simultaneously with the removal of a conventional ignition key.

Another object is to provide a motor vehicle battery circuit control switch that can be readily installed in conjunction with a conventional type of ignition switch.

Still another object of this invention is to provide a construction which is simple and durable and economical from a utility and manufacturing standpoint.

Other objects and purposes than those stated will appear on an understanding of the invention had from the following description, taken in conjunction with the accompanying drawings, in which like numbers refer to like parts in the different views.

In the drawings:

Figure 1 is a sectional view of the device of this invention.

Figure 2 is a sectional view taken on line 2—2 of Figure 1.

Figure 3 is a sectional view taken on line 3—3 of Figure 1.

Figure 4 is a plan view of the switch blade contactor.

Figure 5 is a front view of the control handle.

Figure 6 is a partial section of a modified form of combined ignition lock and control lock.

Figure 7 is a sectional view taken on line 7—7 of Figure 6.

Figure 8 is a schematic outline of the switch circuit.

Figure 9 is a partial section of a second modified form of a combined ignition lock and control lock for use with an ignition system of the grounded cable type.

Figure 10 is a front view of the lock as shown in Figures 6 and 9.

Referring now in detail to the drawings the disconnecting device of this invention is shown generally as numeral 10. The device 10 is formed as a disconnecting switch mounted in a metal housing 11 adapted for securing to a fender, fire wall or like area of a motor vehicle by suitable bolt or screw means inserted through lugs 12 attached to the housing, having a flexible control cable or rod 35 operable by a knob 60 adapted for mounting on the dash 45 of a motor vehicle. The housing 11 is of sufficient size to allow for the mounting therein spaced from the bottom section 13 of two copper bars 14 and 15 insulated from the said bottom section 13 by an insulating strip 16 formed of suitable insulating material. The copper bars 14 and 15 are held in place by suitable electrical threaded conducting posts 17 formed with heads 18 and insulated from the outside of the housing 11 by insulating collars 19. Secured to one of the posts 17 is the battery cable 20 held in place by suitable nut 21 threaded onto the post 17 so as to provide a good electrical connection between the battery terminal 20 and one of the switch bars 14. The opposite bar 15 is similarly connected to the starter clip 30. Bars 14 and 15 are spaced apart by adjacent ends being formed with oppositely diverging contact portions 22. The space between the contact portions 22 is adapted for bridging by a movable wedge-like contactor 23 suspendedly carried by a spring mounted arm 26. Arm 26 being supported from the housing by a spring 27 suitably secured thereto by rivets 28 or like securing means. The spring 27 being likewise secured to the housing 11 as best illustrated in Figure 1. The contactor 23 is suspended from arm 26 by a vertical pin rectangular in shape mounted in a suitable insulating block 24 carried by the contactor 23. Extending through the pin 25 is a transverse pin 29 adapted for maintaining the connection of the contactor 23 to the arm 26 as an angularly displaceable working connection in order that the contactor will be allowed to fall into close engagement with the bar ends 22 under urge of spring 27. Pivotally mounted below the arm 26 is an actuating lever 31 having a suitable pivot 32 at one end and spaced from said end and adapted for arcuate movement under the arm 26 is a roller 33 carried by and extending transversely of the lever 31. The under surface of arm 26 is formed with a downwardly extending inclined plane surface 34 against which the roller 33 is forced into contact on its pivotal movement away from the contactor 23. The free end of lever 31 is provided with an apertured swivel post 36 to which is secured the control cable or wire 35 by a set screw 37 carried by the swivel. The control wire 35 extends into a suitable flexible tube 38 extended into the housing 11 and secured in place by a suitable coupling means 40 threaded to the end 39 of tube 38. The length of tube 38 is sufficient to extend to a position adjacent the dash 45 of the motor vehicle in which the control is mounted with the end thereof 41 secured to a suitable control cylinder or sleeve 42 formed with threads 43 spaced from an outer shoulder 44 and adapted for insertion through a suitable aperture formed in the dash 45 and secured in place by locking nut 46 screwed against the inner surface of the dash. Inside of the cylinder 42 is carried a piston-like member 47 having an extension 66 adapted for insertion into the end 41 of tube 38 to which the control wire 35 is secured.

Cylinder 41 is provided with extending pins 53 suitably spring biased outwardly as by means of conventional springs (not shown) contained within the cylinder 47 adapted to engage in apertures 54 and 55 formed in the interior top surface of member 42. The arrangement of the pins 53 and cylinder 47 is such that upon rotation of cylinder 79 the pins 53 may be extended or retracted to engage apertures 54 and 55.

Extending longitudinally of member 47, as best illustrated in Figure 1, is a closed ended slot 56 into which protrudes a recessed stop screw 57. The length and arrangement of slot 56 and pin 57 is such as to provide for limited axial movement of member 47 which is thus also restricted against rotation in order that pin 53 will always fall in alignment with apertures 54 and 55. Integrally formed with member 47 is a hand knob 60 having a peripheral rim 59 making push and pull operation of the control member 47 easy for the operator of the motor vehicle. It is to be noted that pivot 32 of the lever 31 is spaced sufficiently from the side wall of the housing 11 to allow lever 31 to be moved to a fully biased position with the control pulled out so that pin 53 engages in aperture 55. Also, that roller 33 is placed in engagement with the planar surface of the free end of arm 26 which removes any tendency of the blade 31 to return to a switch closed position.

In Figure 5 is shown the face of the handle 60 showing the key cylinder 79 formed with a keyhole 80 in a vertical position from which it is capable of being moved by a key 81 to a suitable unlocked position. Fused connection of the switch bar 15 with the general electrical system of the motor vehicle such as the lighting, horn, and accessory circuits is provided by suitable fuse clips 85 mounted on an insulating base 86 outside of the housing 85 provided with suitable securing screws or bolts 87 one of which is placed in electrical communication with bar 15. Between the fuse clip is mounted a fuse 88 of suitable capacity and connection to the aforesaid electrical circuits is provided by a suitable connecting post 89 carried on the fused end of block 86. The schematic arrangement of the switch is illustrated in Figure 8 wherein the switch 82 is illustrated as closing the circuit by the conductors 83 and 84 of the positive and negative sides of an electrical source of D. C. supply.

Figures 6 and 7 disclose a modified form of the invention wherein a cylinder 47' is of reduced cross-section as compared with cylinder 47 and adapted to be positioned adjacent a second cylinder 48 adapted to be rotated by means of a key 74. The cylinder 48 is provided with a retracted portion 49 adapted to receive the end of a plunger 50, the plunger 50 being formed as a cylinder and having inserted therein a compressible spring 52 biasing outwardly a pin 53' adapted to engage a suitable aperture 54' in tubular member 47', the pin 53' being adapted to pass through a suitable aperture 54'' in the wall of a tubular member 42' surrounding cylindrical member 47'. The control 42' is combined with a conventional type of ignition lock provided with ignition wire connecting posts 63 to form a combined structure 61. In this type of structure the plunger 53' is arranged to be operated by the ignition tumbler 48 by ignition key 74 to engage in slots 64 and 65 formed in member 47' of the hand pull-out control.

Still another modified form is shown in Figure 9 illustrated by a combined structure 75 wherein a grounded cable type of ignition lock is positioned with the control unit 42. In this type of unit which is intended to replace a conventional ignition lock structure the grounded cable 77 carrying ignition wires 78 is merged into the back of the ignition switch 76.

Figure 10 illustrates the face of a combined ignition lock and control lock unit 69 having a tumbler face 70 operable by a key 74 inserted in slot 71. Two alternative positions of slot 71 are shown in dotted lines from the normal vertical position illustrated. Position 72 in which the key is turned to the right is intended to effect ignition on with the control switch locked in a closed position, position 71 or the normal vertical position is indicative of the ignition being locked off and the control switch being operable to either an open position or a closed position. With the key turned to the left or position 73 the ignition will be held in an off position and the control switch locked in an open position.

The invention is defined in the appended claims and is to be considered comprehensive of all forms of structure coming within their scope.

I claim:

1. In a construction as described, the combination of a switch adapted for connection in series with a battery circuit of a motor vehicle having a housing, spaced angularly disposed contact surfaces, a spring urged switch arm spaced from said contact surfaces, said arm having an under surface formed as an inclined plane, a roller mounted adjacent said inclined plane and pivotally engageable thereunder to lift said arm, a contactor insulatedly suspended from the arm and normally engaging between said contact surfaces, actuating means in engagement with the roller for forcing said roller into engagement with the inclined plane to raise the contactor out of engagement with the contact surfaces, a positioning means connected to the actuator, spring mounted stop means associated with said positioning means, a rotary cylinder engageable with the stop means to move said stop means to locking position to lock said positioning means.

2. In a construction as described, the combination, of a switch housing, said housing having a vertical wall disposed from a bottom wall, a pair of spaced contacts carried by said bottom wall and adapted for series connection in a battery circuit, said contacts being formed with divergent faces, an arm disposed above said contacts having opposite ends disposed at each side of said faces, a spring means connecting one end of said arm to the vertical wall with the opposite end left free, said opposite end being formed with an inclined under surface, a wedge-like electrical conducting member insulatedly suspended from said arm and engageable between said faces of the contacts to close the circuit therethrough, said member being normally moved into close engagement between said contacts under the urge of said spring carried arm, a lever pivoted at one end below the plane of said arm, said lever having a transversely disposed roller engageable with said inclined under surface to move the arm upward on rocking of said lever, and operating means connected to said lever.

ESTEL M. WARREN.

REFERENCES CITED

The following references are of record in the file of this patent:

UNITED STATES PATENTS

| Number | Name | Date |
|---|---|---|
| 648,432 | Prentiss | May 1, 1900 |
| 1,917,104 | Ehrlich | July 4, 1933 |
| 1,935,509 | Leeah | Nov. 14, 1933 |
| 2,171,457 | Schuyler | Aug. 29, 1939 |
| 2,277,671 | Williams | Mar. 31, 1942 |
| 2,439,634 | Robey | Apr. 13, 1948 |